Dec. 6, 1927.

H. COLLINS

TIRE CHAIN LOCKING TIGHTENER

Filed July 25, 1927

1,651,512

Inventor
Hobart Collins

By G.C. Kennedy.

Attorney

Patented Dec. 6, 1927.

1,651,512

UNITED STATES PATENT OFFICE.

HOBART COLLINS, OF UNION TOWNSHIP, HARDIN COUNTY, IOWA.

TIRE-CHAIN LOCKING TIGHTENER.

Application filed July 25, 1927. Serial No. 208,301.

My invention relates to improvements in tire-chain locking tighteners, and the object of my improvement is to supply a device for these purposes, of simple and inexpensive construction, and self-locking while tightly connecting opposite parts of such a chain.

Figure 1:
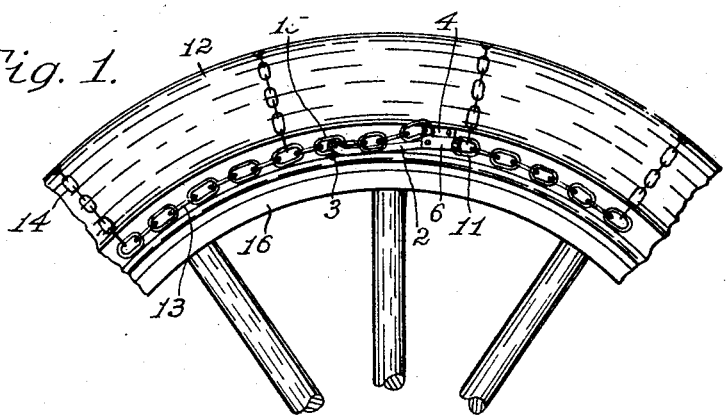
Figure 2:
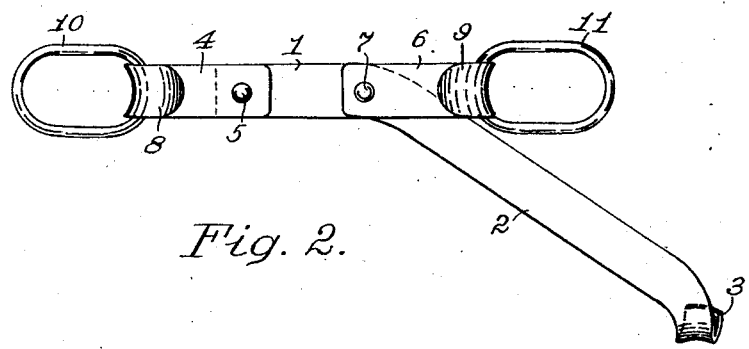
Figure 3:
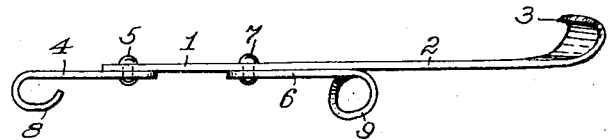
Figure 4:
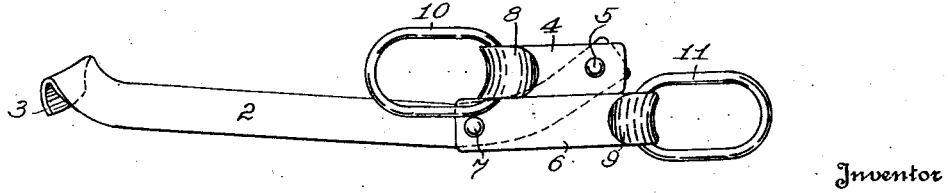

This object I have accomplished by the means which are hereinafter described and claimed, and which are illustrated in the accompanying drawings, in which Fig. 1 is a fragmental portion of an automobile wheel and pneumatic tire thereon, showing a tire-chain secured thereon by tightening and locking means of my invention. Fig. 2 is a full size side elevation of my said device in its open position, and connected to end links, as of a chain. Fig. 3 is an edge view of the same device, in open position, and Fig. 4 is a side elevation of the devise, having its parts rearranged as in positions to tighten said end-links of a tire-chain and in self-locking the device to the chain, as shown in Fig. 1.

The numeral 16 denotes an automobile wheel having mounted upon its rim a pneumatic tire 12. The numeral 13 denotes a well-known type of tire-chain having side-chains and cross-chains 14 passed over the tire tread. My improved device comprises but three pivotally connected and coacting elements, a link 1 which has one end extended at a small angle to provide an arm 2 with a hooked outer terminal 3, and two like but reversed terminally hooked bars 4 and 6 which are pivotally connected to said link 1 by pintles 5 and 7 respectively. In Fig. 2, the bars 4 and 6 are spread apart in alinement with the intermediate link part 1 and with their end hooks 8 and 9 respectively represented as engaged with links 10 and 11, being end links of the side chain 13 shown in Fig. 1, the device being in open or spread out position. This is the arrangement when the device is initially spread to loosely connect said end links of a side-chain 13. In order to draw together said end links and tighten said side-chain upon the tire 12, it is only necessary for the operator to swing the lever arm 2 downwardly and to the left to the closed position shown in both said Figures 1 and 4.

The link element 1 which is integral with the arm 2 swings to the right to place the left-hand hooked bar 4 parallel to and in longitudinal edge contact with the other hooked bar 6, so that the side-chain is tightened by the drawing together of the end links 10 and 11 thereof by the hooks 8 and 9 respectively.

When the arm 2 is swung to the left to place it in alinement with the hooked bar 6, the end hook 3 thereof may be engaged with a link 15 of said side-chain, locking it thereto releasably.

However, the taut side-chain 13, positioned as it is upon said tire 12, exercises some tension upon the engaged link 15, tending to prevent its disengagement therefrom, and in any event, the hook 8 remains in engagement with the end link 10, also under tension lengthwise, preventing release of the connected parts of the side-chain. Reversing this operation, by disengaging the hook 3 from the link 15, the arm 2 may be swung back to the right, bringing the parts 1, 4 and 6 again into their outspread alined position.

While the wheel 16 is rotating upon a street or way, the hook 3 of the arm 2 is positioned to open inwardly toward the axis of the wheel, so that objects contacted by the tire will not cause disengagement of the hook, inwardly. There is, of course, no possibility of disengaging the hook 3 in a direction toward the tread of the tire, unless the arm 2 is sprung away from the face of the wheel, which must be performed manually. The device is thus safely, though releasably, locked in closed position, and safe from accidental displacements.

Having described my invention, what I claim as new, and desire to secure by Letters Patent, is:

A tire-chain locking tightener, comprising a rigid link body bent in the same plane with short and long members at a small angle, and terminally hooked elements pivotally connected respectively to an end of the short member and at the angle of said members and to releasably engage end links of a tire-chain mounted around a tire, the long member of the link body serving as an operating arm and having a terminal hook bent toward the adjacent side face of the tire to, when swung to a closed position, be detachably engaged with a longitudinal side part of a link beyond the adjacent and engaged end link of the chain, with the opening of the hook directed toward the axis of the tire, whereby all the said link connections are substantially in line around the tire and the arm end hook stopped from displacement radially outward by the abutting side bulge of the tire.

In testimony whereof I affix my signature.

HOBART COLLINS.